(12) United States Patent
Wallenhorst et al.

(10) Patent No.: US 10,947,410 B2
(45) Date of Patent: Mar. 16, 2021

(54) COATED GRANULAR MATERIAL

(71) Applicant: ASK CHEMICALS GMBH, Hilden (DE)

(72) Inventors: Carolin Wallenhorst, Düsseldorf (DE); Reinhard Winter, Wülfrath (DE); Jan Klesing, Essen (DE)

(73) Assignee: ASK CHEMICALS GMBH, Hilden (DE)

( * ) Notice: Subject to any disclaimer, the term of this patent is extended or adjusted under 35 U.S.C. 154(b) by 412 days.

(21) Appl. No.: 15/565,995

(22) PCT Filed: Apr. 12, 2016

(86) PCT No.: PCT/EP2016/058012
§ 371 (c)(1),
(2) Date: Oct. 12, 2017

(87) PCT Pub. No.: WO2016/166100
PCT Pub. Date: Oct. 20, 2016

(65) Prior Publication Data
US 2018/0112103 A1    Apr. 26, 2018

(30) Foreign Application Priority Data

Apr. 13, 2015 (DE) .......................... 102015004670.5

(51) Int. Cl.
*C09D 175/04* (2006.01)
*B32B 27/40* (2006.01)
(Continued)

(52) U.S. Cl.
CPC ............ *C09D 175/04* (2013.01); *B32B 27/40* (2013.01); *C05B 17/00* (2013.01); *C05G 5/37* (2020.02);
(Continued)

(58) Field of Classification Search
None
See application file for complete search history.

(56) References Cited

U.S. PATENT DOCUMENTS 3,285,223 A     11/1966   Sahlin
4,338,408 A      7/1982   Zimmerman et al.
(Continued)

FOREIGN PATENT DOCUMENTS

DE     1242573 B     6/1967
DE     2155924 A1    5/1973
(Continued)

OTHER PUBLICATIONS

International Search Report and English Translation thereof for International Application No. PCT/EP2016/058012, dated Aug. 4, 2016 (9 pages).

*Primary Examiner* — Wayne A Langel
(74) *Attorney, Agent, or Firm* — Kagan Binder, PLLC

(57) ABSTRACT

The present invention relates to a coated granular substance, wherein the coating comprises a resin comprising the reaction product of a polyol component and an isocyanate component and cured by the addition of a catalyst, said catalyst comprising a hydroxy group-containing amine compound.

Further, the present invention relates to a process for coating a granular substance, comprising the steps of (a) providing a granular substance; (b) providing a polyol component and an isocyanate component; (c) optionally mixing the polyol component with the isocyanate component; (d) adding the mixture of step (c) or the polyol component and the isocyanate component as individual substances to the provided granular substance and producing a coating on the granular substance; (e) adding a catalyst to cure the coating; (f)
(Continued)

optionally repeating steps (d) and (e), wherein the catalyst comprises a hydroxy group-containing amine compound.

15 Claims, 2 Drawing Sheets

(51) Int. Cl.
| | |
|---|---|
| C05G 3/00 | (2020.01) |
| C08G 18/54 | (2006.01) |
| C08G 18/18 | (2006.01) |
| C08G 18/16 | (2006.01) |
| C08G 18/24 | (2006.01) |
| C08G 18/76 | (2006.01) |
| C05G 5/30 | (2020.01) |
| C05B 17/00 | (2006.01) |
| C08G 18/30 | (2006.01) |
| C08G 18/32 | (2006.01) |
| C08G 18/65 | (2006.01) |

(52) U.S. Cl.
CPC ....... *C08G 18/165* (2013.01); *C08G 18/1808* (2013.01); *C08G 18/1825* (2013.01); *C08G 18/1833* (2013.01); *C08G 18/246* (2013.01); *C08G 18/30* (2013.01); *C08G 18/3206* (2013.01); *C08G 18/542* (2013.01); *C08G 18/65* (2013.01); *C08G 18/7664* (2013.01); *C08G 18/7671* (2013.01); *C08G 2150/50* (2013.01)

(56) References Cited

U.S. PATENT DOCUMENTS

| | | | | |
|---|---|---|---|---|
| 4,433,170 | A | | 2/1984 | Zimmerman et al. |
| 4,464,488 | A | | 8/1984 | Zimmerman et al. |
| 4,711,659 | A | * | 12/1987 | Moore ...................... C05C 9/00 504/231 |
| 4,772,490 | A | * | 9/1988 | Kogler ..................... C05G 5/37 427/212 |
| 6,001,147 | A | * | 12/1999 | Markusch ............ C05G 3/0029 71/27 |
| 6,165,550 | A | * | 12/2000 | Markusch ............ C05G 3/0029 427/212 |
| 6,176,891 | B1 | * | 1/2001 | Komoriya ............ C05G 3/0029 71/11 |
| 7,452,399 | B2 | * | 11/2008 | Whittington ............. B01J 2/006 71/63 |
| 9,067,842 | B2 | * | 6/2015 | Neff ...................... C05G 3/0029 |
| 2003/0033843 | A1 | * | 2/2003 | Tabei ................... C05G 3/0029 71/64.02 |
| 2005/0005661 | A1 | * | 1/2005 | Winter ................. C05G 3/0029 71/64.02 |
| 2010/0196431 | A1 | * | 8/2010 | Watanabe ............ C05G 3/0029 424/419 |
| 2010/0326152 | A1 | * | 12/2010 | Mente .................. C05G 3/0029 71/27 |
| 2013/0305796 | A1 | * | 11/2013 | Hudson .................... C05B 17/00 71/28 |
| 2013/0305797 | A1 | * | 11/2013 | Neff ..................... C05G 3/0088 71/30 |
| 2014/0033779 | A1 | * | 2/2014 | Bertin .................... A01N 25/26 71/64.07 |
| 2015/0040630 | A1 | | 2/2015 | Yang et al. |
| 2015/0376077 | A1 | * | 12/2015 | Barr ..................... C05G 3/0029 71/28 |
| 2017/0036968 | A1 | * | 2/2017 | Praw ........................ C05C 1/02 |

FOREIGN PATENT DOCUMENTS

| | | |
|---|---|---|
| DE | 102005041763 A1 | 3/2007 |
| DE | 102009037009 A1 | 2/2011 |
| EP | 0230601 A2 | 8/1987 |
| EP | 1451129 A1 | 9/2004 |
| EP | 2818040 A1 | 12/2014 |
| WO | 96/41779 A1 | 12/1996 |
| WO | 02/096548 A1 | 12/2002 |
| WO | 03/048075 A1 | 6/2003 |
| WO | 2009/117479 A2 | 9/2009 |
| WO | 2011/084865 A1 | 7/2011 |
| WO | 2013/077725 A2 | 5/2013 |

* cited by examiner

COATED GRANULAR MATERIAL

CROSS-REFERENCE TO RELATED APPLICATIONS

This application claims priority to International Application No. PCT/EP2016/058012, filed Apr. 12, 2016, and titled "COATED GRANULAR MATERIAL", which in turn claims priority from German Application having serial number DE 10 2015 004 670.5, filed on Apr. 13, 2015, both of which are incorporated herein by reference in their entireties.

TECHNICAL FIELD

The present invention relates to coated granular substances, wherein the coating comprises a resin comprising the reaction product of a polyol and an isocyanate component and cured by the addition of a catalyst. The invention also relates to the process for producing said coated granular substances.

STATE OF THE ART

Granular, at least partially water-soluble substances coated with a water-insoluble but water-permeable layer are generally known. These substances have reached particular importance in the field of fertilizers, since the dissolution rate of the active ingredients can be controlled by the coating. In this way it is possible to obtain long-term fertilizers having an effectiveness of several months.

As coating resins, various systems have been suggested. The following examples represent a small selection only.

DE 1242573, e.g., describes a process for encapsulating granules by means of a coating agent consisting of a copolymer of drying or semi-drying oils with cyclopentadiene.

DE 2155924 discloses phenol resols for coating granulated fertilizers.

According to WO 02/096548, the coating is effected using a 2-component system based on maleinate oil and epoxidized oils.

In WO 96/41779, a carboxy group-containing ethylene copolymer is used.

In EP 0230601 and EP 1451129, 2-component polyurethane systems are used.

In the two latter patent applications, the curing of the coating components is preferably catalyzed by amines, two types of catalyst addition being disclosed. On the one hand, amines may be introduced into the coating apparatus in gaseous pure form or as a gaseous mixture with air or inert gas after coating the granular substances with the polyol and the isocyanate component, on the other hand, the catalyst may be added to the polyol component prior to coating.

If the catalyst is supplied as a gas, preferably low-boiling amines such as, e.g., trimethyl amine, triethyl amine, dimethyl ethyl amine or dimethyl isopropyl amine are used. If, however, the catalyst is added to the polyol component, higher-boiling amines or other catalysts commonly used in polyurethane chemistry are used.

In particular the gas process is used on a large scale in practice. There are, however, in particular three aspects which are disadvantageous:

Due to the high inflammability of the catalysts, the coating systems have to be explosion-proof, which means enormous investment costs.

Due to the toxicity and the characteristic unpleasant odour of the low-boiling amines, the latter must not be released to the environment. Therefore, upon exiting the coating apparatus, the entire gas stream has to be subjected to a specific after-treatment in which the amines are removed from the exhaust air. There are also increased demands regarding the tightness of the entire system including the feed and discharge lines. All this also represents a not insubstantial cost factor.

If the coating is applied in several layers, the system has to be rinsed to be completely free of catalyst prior to applying each new layer in order to prevent a premature reaction of the polyol and the isocyanate components. This procedure is time-consuming and causes an increased catalyst consumption.

The second type of curing in which the catalyst is present dissolved in the polyol component has specific disadvantages.

Many of the per se suitable catalysts are not or not sufficiently soluble in the polyol.

Some of the per se suitable catalysts even cause a phase separation or result in precipitation in the polyol component.

Curing often already starts before the two reactants are evenly distributed around the grain to be coated.

Furthermore, the catalysts used in the prior art result in relatively slow curing of the polyurethane coating. This results in an increased production time, in particular if several layers are to be applied to the granular substance.

An object of the present invention is to provide coated granular substances with good release properties of the granular substance. Moreover, the aforementioned problems are to be overcome in the production of the coated granular substances. Another object is to provide a production process for coating granular substances in which the curing of the coating takes place within a short period of time.

DISCLOSURE OF THE INVENTION

The above problems are solved by the coated granular substance and the process for coating a granular substance in accordance with the present invention. Thus, the subject-matter of the present invention is a coated granular substance, wherein the coating comprises a resin comprising the reaction product of a polyol component and an isocyanate component and cured by the addition of a catalyst, said catalyst comprising a hydroxy group-containing amine compound of the general formula (I):

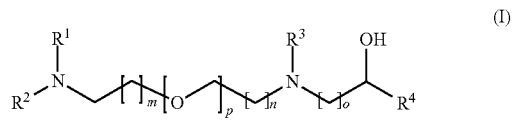
(I)

wherein $R^1$ is a $C_1$ to $C_4$ alkyl group; $R^2$ is a $C_1$ to $C_4$ alkyl group; $R^3$ is a $C_1$ to $C_4$ alkyl group, a group $—(CH_2)_q—CH(OH)R^5$ or a group $—CH_2—(CH_2)_r—NR^6R^7$; $R^4$ is a hydrogen atom or a $C_1$ to $C_4$ alkyl group; $R^5$ is a hydrogen atom or a $C_1$ to $C_4$ alkyl group; $R^6$ is a $C_1$ to $C_4$ alkyl group; $R^7$ is a $C_1$ to $C_4$ alkyl group; m is an integer from 0 to 10; n is an integer from 0 to 10; o is an integer from 1 to 10; p is an integer from 0 to 10; q is an integer from 1 to 10; and r is an integer from 0 to 10.

Furthermore, the subject-matter of the present invention is a process for coating a granular substance, comprising the steps (a) of providing a granular substance; (b) providing a polyol component and an isocyanate component; (c) optionally mixing the polyol component with the isocyanate component; (d) adding the mixture of step (c) or the polyol component and the isocyanate component as individual substances to the provided granular substance and producing a coating on the granular substance; (e) adding a catalyst to cure the coating; (f) optionally repeating steps (d) and (e), wherein the catalyst comprises a hydroxy group-containing amine compound of the general formula (I) above.

BRIEF DESCRIPTION OF THE DRAWINGS

A brief description of the drawings is as follows.

DETAILED DESCRIPTION

Figure 1:
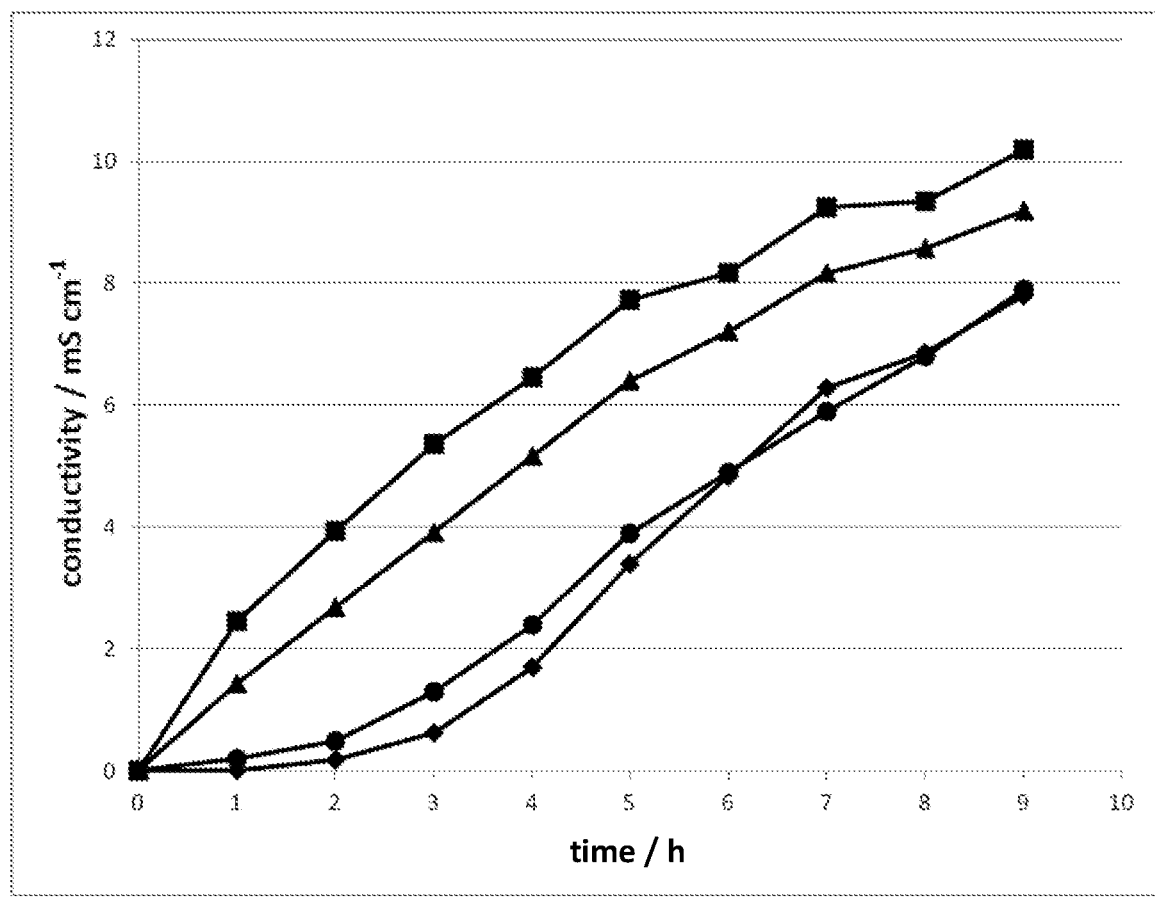
FIG. 1 is a graph showing the release of active agent is determined by the increase in conductivity of the water.

The coated granular substance according to the present invention contains a granular substance (hereinafter also referred to as "the granular substance to be coated") which is coated with a resin.

The granular substances to be coated are not critical, they may be selected from the substances known in the technical field. Basically, all granular substances may be coated by means of the coating system according to the invention. The granular substance may, e.g., be selected from asymmetrically shaped granular substances (granules) or symmetrically shaped substances (pellets). Typical pellets may, e.g., have the shape of a sphere, a rod, a cylinder, or an ellipsoid. Typical granules include asymmetrical aggregates of powder particles, whole crystals, crystal fragments or particles or other fragments. The granular substance may be porous or non-porous.

The grain size of the granular substances to be coated is not critical, either. It may, e.g., be from about 0.1 mm to about 15 mm (average longest diameter), an average grain size within the range of about 1 mm to about 5 mm being preferred.

The granular substances to be coated are preferably at least partially water-soluble. Thus, the granular substances to be coated may also contain water-insoluble components. The solubility of the water-soluble components of the granular substance in water at 20° C. is preferably at least 10 g/liter, more preferably at least 30 g/liter and particularly preferred at least 100 g/liter. Preferably, the granular substances to be coated completely consist of water-soluble components.

Examples of such granular substances are agrochemicals such as fertilizers, plant protection agents, pesticides (including insecticides, fungicides, bactericides, akaricides, molluscicides, nematicides, rodenticides, avicides), growth regulators, trace elements, soil improving agents or mixtures thereof. Preferred granular substances are fertilizers, pesticides (including herbicides, fungicides, insecticides, bactericides, akaricides, molluscicides, nematicides, rodenticides, avicides), nitrification inhibitors, urease inhibitors, pheromones, repellents against animals and insects, growth regulators, trace elements, soil improving agents or mixtures thereof, more preferably fertilizers and trace elements. Preferably, the granular substance comprises the aforementioned agrochemicals (active agents) or the granular substance consists of the aforementioned agrochemicals. In the present invention, very highly hygroscopic substances may also be used as the granular substance to be coated, e.g., desiccants such as phosphorous pentoxide or calcium chloride. By means of the coating, too rapid dissolution in humid environment may be avoided. Preferred granular, at least partially water-soluble substances are fertilizers.

Fertilizers which are suited for coating include known granules or pellets of organic and mineral fertilizers as well as mixtures thereof. E.g., single- or multi-nutrient fertilizers may be taken into consideration which individually or in combination contain nutrients such as nitrogen, potassium or phosphorus in the form of their salts or oxides. Examples thereof are N, NP, NK, PK or NPK fertilizers such as calcium ammonium nitrate, ammonium sulphate, ammonium sulphate nitrate, calcium cyanamide, ammonium nitrate or urea. Along with the mentioned main constituents, salts of trace elements such as magnesium, iron, manganese, copper, molybdenum and/or boron may also be contained in the fertilizer granules in small amounts, usually in amounts of up to about 5% by weight, preferably of about 0.5 to about 3% by weight. Suitable organic fertilizers are, e.g., guano, fish meal or bone meal.

The coating comprises a resin comprising the reaction product of a polyol component and an isocyante component and cured by means of a catalyst comprising a hydroxy group-containing amine compound of the general formula (I).

The polyol and isocyanate components described in EP 0 230 601 A1 and WO 03/048075 A1 may, e.g., be used for coating the at least partially water-soluble granular substances. The disclosure content of these applications is herewith incorporated into the present application by reference.

The polyol component preferably comprises a base polyol comprising at least one compound selected from cardol or cardanol, their derivatives or their oligomers, and/or a condensation product of phenols and aldehydes.

Cardol and cardanol are substituted phenols or resorcines and may be obtained from the renewable resource cashew nut shell liquid (CSNL).

Cashew nut shell liquid is obtained from the seeds of the cashew tree and consists of about 90% by weight of anacardic acid and about 10% by weight of cardol. By means of heat treatment in an acidic environment, cardanol, a substituted phenol, as well as cardol are produced by decarboxylation. Cardol and cardanol may be obtained as pure substances by distillation. Along with the latter, oligomers of these compounds are also produced which remain in the bottom of the distillation column and can be retrieved by common methods known to the person skilled in the art.

According to the invention, suitable starting materials for the reaction with the isocyanate component are, e.g., cardol and cardanol obtained from cashew nut shell liquid or mixtures thereof as well as their oligomers from the bottom of the distillation column which are available as technical products. Moreover, derivatives of cardol and/or cardanol may also be used as starting materials. By way of examples, reaction products obtained by maleinating, epoxidizing or hydrogenating the double bonds present in the side chains are to be mentioned here. These may optionally be further reacted with water or an alcohol, whereby diols or α-hydroxy ethers are produced in the side chains. Further suitable derivatives of cardol and/or cardanol may also be obtained by reacting these compounds or the compounds obtained by maleinating, epoxidizing or hydrogenating with an aldehyde.

Cardol, cardanol and their derivatives obtainable in accordance with the above methods may be oligomerized by known processes, such as, e.g., by the reaction with formaldehyde. Due to their hydroxy functionality, both the monomers and the oligomers are well-suited for reacting with isocyanates and may, e.g., partially or completely replace condensation products of phenols and formaldehyde in some applications.

The polyol component of the present invention preferably comprises at least one compound selected from cardol and/or cardanol or their derivatives or oligomers or mixtures thereof at a proportion of about 5 to about 100% by weight, preferably of about 7 to about 70% by weight, particularly preferably about 10 to about 40% by weight.

According to the present application, phenols are aromatic compounds containing a phenyl group and at least one phenolic hydroxy group. Examples of phenols are phenol, pyrocatechol, resorcinol, hydroquinone, pyrogallol, phloroglycine and naphthols, preferably phenol and resorcinol. The phenols may be substituted with other functional groups, such as, e.g. halogen atoms, alkyl groups, alkoxy groups, aryl groups or alkylaryl groups. Examples of substituted phenols are cresols, thymol, bisphenol-A and methylene diphenol. The phenolic hydroxy groups may be substituted with alkyl groups. Examples of the condensation products of phenols and aldehydes are benzylether resins, novolaks and resols. In the preparation of the condensation products, cardol and/or cardanol or their derivatives or oligomers alone or in combination with other phenols may also be condensed with aldehydes. As an aldehyde, aldehyde-containing compounds, such as formaldehyde, acetaldehyde, propionaldehyde, glyoxal, acrolein or aldehyde donors, such as, e.g., paraformaldehyde or hexamethylene tetramine, may be used. These resins contain at least 2, preferably 2 to 8 hydroxy groups in the molecule. Particularly preferred are benzylether resins constituted by units of formula (VI)

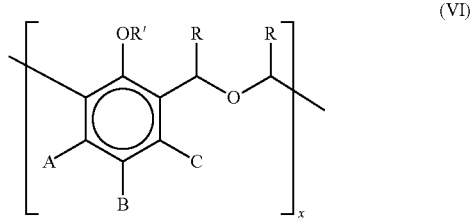

(VI)

wherein A, B and C may be the same or different and each represent a hydrogen or halogen atom, a $C_1$ to $C_{10}$ hydrocarbon group, a $C_1$ to $C_{10}$ oxy hydrocarbon group, a methylol group, an isopropylidene phenol or methylene phenol group, and when A, B or C has a hydroxy functionality, the latter may be etherified with a $C_1$ to $C_{10}$ hydrocarbon group; R is a hydrogen atom or a $C_1$ to $C_{10}$ hydrocarbon group; R' is a hydrogen atom or a $C_1$ to $C_{10}$ hydrocarbon group and x is within the range of from 1 to 15.

Preferably, A, B, and C are independently a methyl, butyl, octyl or nonyl group, and particularly preferably a methyl group. R is preferably a hydrogen atom. R' is preferably a methyl, butyl, octyl or nonyl group and particularly preferably a methyl group. It is particularly preferred that A, B and C independently represent a methyl, butyl, octyl or nonyl group, R is a hydrogen atom and R' is a methyl, butyl, octyl or nonyl group. Still more preferred, A, B, C, and R' are each a methyl group and R is a hydrogen atom.

The condensation product of phenols and aldehydes (resin component) is contained in the polyol component preferably at an amount of about 10 to about 90% by weight, preferably of about 20 to about 70% by weight, based on the polyol component. At a content of below 10% by weight, the strength of the water-permeable coatings may decrease, whereas at a resin proportion of above 90% by weight, the elasticity of the coatings may decrease.

As a base polyol, the polyol component preferably comprises at least one compound selected from cardol or cardanol, their derivatives or their oligomers and optionally a condensation product of phenols and aldehydes.

In addition to the base polyol, the polyol component may contain a hydroxy group-containing plasticizer and optionally a hydroxy group-containing diluent.

As the hydroxy group-containing plasticizer, the substances used in polyurethane chemistry for this purpose, such as, e.g., long-chain aliphatic alcohols and their derivatives, such as hydroxy functional polyethers and polyesters, are suitable, coatings of excellent elasticity exhibiting the desired slow release properties being obtained in particular with castor oil and polyether polyols without these plasticizers being able to migrate from the coating and cause subsequent embrittlement.

If required, a hydroxy group-containing diluent may be added to the polyol component to adjust the viscosity of the coating composition. Here, too, the substances commonly used in polyurethane chemistry for this purpose may be used, e.g., monofunctional alcohols such as butanol or diacetone alcohol, or glycerol, ethylene glycol, diethylene glycol, butane diol.

The relative amounts of plasticizer and diluent used are not particularly critical. Together with the base polyol explained above, the amounts of the two substances constitute the polyol component used in accordance with the invention. Plasticizers and diluents are preferably contained in the polyol component at an amount of about 10 to about 90% by weight, preferably of about 20 to about 70% by weight, based on the polyol component.

The polyol component preferably contains from about 10 to about 40% by weight of a base polyol, from about 40 to about 70% by weight of a plasticizer, and from about 5 to about 20% by weight of a diluent. Particularly preferably, the polyol component contains from about 25 to about 35% by weight of a condensation product of phenols and aldehydes, from about 5 to about 15% by weight of cardanol, from about 50 to about 60% by weight of castor oil, and from about 5 to about 10% by weight of diethylene glycol.

In order to avoid undesirable formation of bubbles during the side-reaction of the isocyanates with traces of water, further common additives such as desiccants (for example zeolites or other molecular sieves, or ortho-formic acid esters), wetting auxiliaries such as, e.g., surface-active agents, flow control agents such as, e.g., silicone-based additives such as polysiloxanes or silicone additives, waxes, processing time regulators such as, e.g. acids and alkalis, or hydrophobing agents, such as, e.g., waxes, may optionally be added to the polyol component according to the invention. Likewise, it is possible to add pigments and/or color pastes to the polyol in order to identify in color the resin coating.

As the isocyanate component for the preparation of the polyurethane coating of the present invention which is applied to the granular substance, aliphatic, cycloaliphatic, aromatic and heterocyclic isocyanates having at least two isocyanate groups in one molecule or their oligomers or their polymers may be used.

Examples thereof are toluene-2,4-diisocyanate; toluene-2,6-diisocyanate; 3-phenyl-2-ethylenediisocyanate, 1,5-naphthalenediisocyanate; 4-methoxy-1,3-diphenyldiisocyanate; 4-chloro-1,3-phenyldiisocyanate; diphenylmethane-4,4'-diisocyanate; diphenylmethane-2,2'-diisocyanate; 4-bromo-1,3-phenyldiisocyanate; 4-ethoxy-1,3-phenyldiisocyanate; 2,4'-diisocyanate-diphenylether; 5,6-dimethyl-1,3-phenyldiisocyanate; 2,4-dimethyl-1,3-phenyldiisocyanate; 4,4'-diisocyanatodiphenylether; 4,6-dimethyl-1,3-phenyldiisocyanate; 9,10-anthracene-diisocyanate, 2,4,6,-toluene-triisocyanate; 2,4,4'-triisocyanatodiphenylether; 1,4-tetramethylenediisocyanate; 1,6-hexamethylenediisocyanate; 1,10-decamethylenediisocyanate; 1,3-cyclohexylenediisocyanate; 4,4'-bis-(cyclohexylisocyanate); xylenediisocyanate; 1-isocyanato-3-methylisocyanato-3,5,5-trimethylcyclohexane (isophoronediisocyanate); 1,3-bis-(isocyanato-1-methylethyl)benzol (m-TMXDI); 1,4-bis-(isocyanato-1-methylethyl)benzol (p-TMXDI).

Aromatic isocyanates such as toluenediisocyanate, diphenylmethanediisocyanate (MDI) etc. as well as oligomers common in this technical field which are based thereon are preferred.

Depending on the desired properties of the final product, from about 0.5% by weight to about 20% by weight, preferably from about 1% by weight to about 15% by weight, and particularly preferably from about 1% by weight to about 10% by weight of the polyol component are used for coating, based on the weight of the granular substance without coating.

The ratio of polyol to isocyanate component is usually selected such that there is a shortage of hydroxy groups of about 30 mol-% to an excess of about 30 mol-%, i.e. a stoichiometric ratio of about 1.3:1 to about 1:1.3, preferably about 1.2:1 to about 1:1.2. Practice has shown that a ratio of about 1:1 does not necessarily yield the best result for later application. When looking at the process under the aspect of stoichiometry, the isocyanate-reactive functional groups of the catalyst might have to be taken into consideration as well.

In order to accelerate the curing reaction of the polyol component with the isocyanate component, a catalyst is used according to the present invention, said catalyst comprising at least one hydroxy group-containing amine compound of the general formula (I):

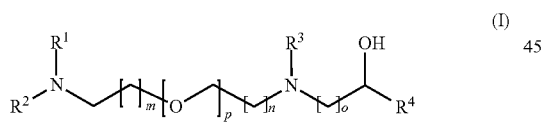
(I)

wherein $R^1$ is a $C_1$ to $C_4$ alkyl group; $R^2$ is a $C_1$ to $C_4$ alkyl group; $R^3$ is a $C_1$ to $C_4$ alkyl group, a group $—(CH_2)_q—CH(OH)R^5$ or a group $—CH_2(CH_2)_4—NR^6R^7$; $R^4$ is a hydrogen atom or a $C_1$ to $C_4$ alkyl group; $R^5$ is a hydrogen atom or a $C_1$ to $C_4$ alkyl group; $R^6$ is a $C_1$ to $C_4$ alkyl group; $R^7$ is a $C_1$ to $C_4$ alkyl group; m is an integer from 0 to 10; n is an integer from 0 to 10; o is an integer from 1 to 10; p is an integer from 0 to 10; q is an integer from 1 to 10; and r is an integer from 0 to 10.

$R^1$ is preferably a methyl or ethyl group, particularly preferably a methyl group. $R^2$ is preferably a methyl or ethyl group, particularly preferably a methyl group. $R^3$ is preferably a methyl or ethyl group, a group $—(CH_2)_q—CH(OH)R^5$ or a group $—CH_2(CH_2)_r—NR^6R^7$. $R^4$ is preferably a hydrogen atom or a methyl group. $R^5$ is preferably a hydrogen atom or a methyl group. $R^6$ is preferably a methyl or ethyl group, particularly preferably a methyl group. $R^7$ is preferably a methyl or ethyl group, particularly preferably a methyl group. m is preferably an integer from 0 to 4, particularly preferably 1 or 2. n is preferably an integer from 0 to 4, particularly preferably 0 or 1. o is preferably an integer from 1 to 4 and particularly preferably o is 1. p is preferably an integer from 0 to 4, particularly preferably 0 or 1. q is preferably an integer from 1 to 4 and particularly preferably 1 or 2. r is preferably an integer from 0 to 10 and particularly preferably 1 or 2.

Particularly preferred is a hydroxy group-containing amine compound of the general formula (I), wherein $R^1$ is a methyl or ethyl group; $R^2$ is a methyl or ethyl group; $R^3$ is a methyl or ethyl group, a group $—(CH_2)_q—CH(OH)R^5$ or a group $—CH_2—(CH_2)_r—NR^6R^7$; $R^4$ is a hydrogen atom or a methyl group; $R^5$ is a hydrogen atom or a methyl group; $R^6$ is a methyl or ethyl group; $R^7$ is a methyl or ethyl group; m is an integer from 0 to 4; n is an integer from 0 to 4; o is an integer from 1 to 4; p is an integer from 0 to 4; q is an integer from 1 to 4; and r is an integer from 0 to 4. Still more preferred is an amine of the general formula (I) wherein $R^1$ is a methyl group; $R^2$ is a methyl group; $R^3$ is a methyl group, a group $—(CH_2)_q—CH(OH)R^5$ or a group $—CH_2—(CH_2)_4—NR^6R^7$; $R^4$ is a hydrogen atom or a methyl group; $R^5$ is a hydrogen atom or a methyl group; $R^6$ is a methyl group; $R^7$ is a methyl group; m is 1 or 2; n i's 0 or 1; o is 1; p is 0 or 1; q is 1 or 2; and r is 1 or 2.

In a preferred embodiment, the hydroxy group-containing amine compound is selected from compounds of the general formulae (II), (III), (IV), and (V):

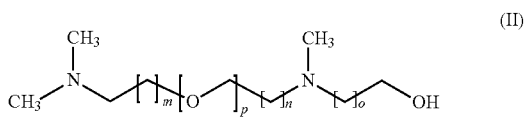
(II)

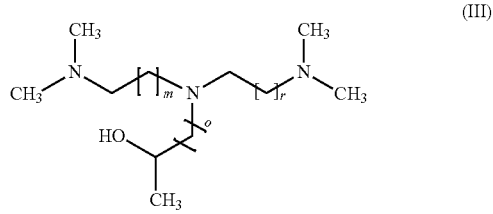
(III)

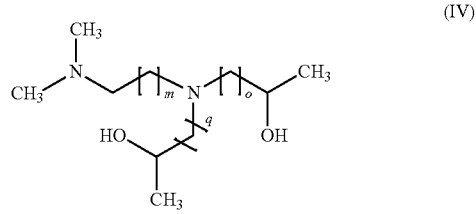
(IV)

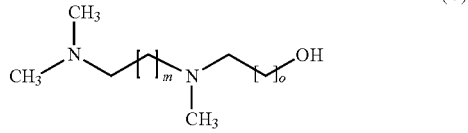
(V)

wherein m, n, o, p, q and r are as defined above. Hydroxy group-containing amine compounds of the general formula (V) are particularly preferred here. Particularly preferably, the hydroxy group containing amine compound is selected from compounds of the general formulae (II), (III), (IV), and (V), wherein m is an integer from 0 to 4; n is an integer from 0 to 4; o is an integer from 1 to 4; p is an integer from 0 to 4; q is an integer from 1 to 4; and r is an integer from 0 to 4. Still more preferably, the hydroxy group-containing amine compound is selected from compounds of the general formulae (II), (III), (IV), and (V), wherein $R^1$ is a methyl group, $R^2$ is a methyl group; $R^3$ is a methyl group, a group $—(CH_2)_q—CH(OH)R^5$ or a group $—CH_2—(CH_2)_r—NR^6R^7$; $R^4$ is a hydrogen atom or a methyl group; $R^5$ is a hydrogen atom or a methyl group; $R^6$ is a methyl group; $R^7$ is a methyl group; m is 1 or 2; n is 0 or 1; o is 1; p is 0 or 1; q is 1 or 2; and r is 1 or 2.

Particularly preferred hydroxy group-containing amine compounds are selected from compounds of the formulae (IIa), (IIIa), (IVa), and (Va):

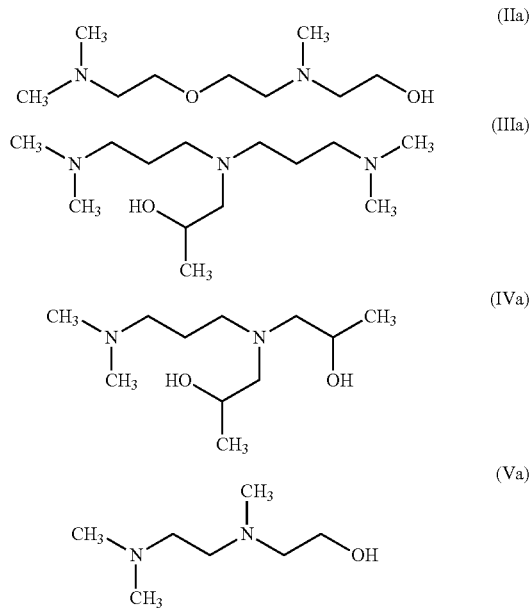

The catalyst comprises the hydroxy group-containing amine compound of the general formula (I) preferably in an amount of at least about 30% by weight, more preferably in an amount of at least about 50% by weight, still more preferably in an amount of at least about 70% by weight, and most preferably in an amount of at least about 90% by weight, based on the total weight of catalyst. Preferably, the catalyst comprises a hydroxy group-containing amine compound selected from compounds of the general formulae (II), (III), (IV), and (V) in an amount of at least about 30% by weight, more preferably in an amount of at least about 50% by weight, still more preferably in an amount of at least about 70% by weight, and most preferably in an amount of at least about 90% by weight, based on the total weight of catalyst. In particular, the catalyst comprises a hydroxy group-containing amine compound selected from compounds of the general formulae (IIa), (IIIa), (IVa), and (Va) preferably in an amount of at least about 30% by weight, more preferably in an amount of at least 50% by weight, still more preferably in an amount of at least about 70% by weight, and most preferably in an amount of at least about 90% by weight, based on the total weight of catalyst.

In a preferred embodiment, the polyol component comprises at least one compound selected from cardol and/or cardanol or their derivatives or oligomers or mixtures thereof, and the catalyst comprises a hydroxy group-containing amine compound selected from the general formulae (II), (III), (IV), and (V). In this embodiment, the polyol component comprises at least one compound selected from cardol and/or cardanol or their derivatives or oligomers or mixtures thereof, preferably at a proportion of about 7 to about 70% by weight, particularly preferably of about 10 to about 35% by weight. In this embodiment, the catalyst comprises the hydroxy group-containing amine compound of the general formula (I) preferably in an amount of at least about 30% by weight, more preferably in an amount of at least about 50% by weight, still more preferably in an amount of at least about 70% by weight, and most preferably in an amount of at least about 90% by weight, based on the total weight of catalyst.

In addition to the hydroxy group-containing amine compound of the general formula (I), the catalyst used to accelerate the curing reaction may comprise further catalysts known from polyurethane coating, e.g., amines, but also metal catalysts. The amines may be both those substances which may react into the resin and those the chemical structure of which does not allow them to do so.

As the amine catalysts, basically all amino functional substances such as aliphatic, cycloaliphatic, heterocyclic and/or aromatic amines may be used. Both primary, secondary and tertiary monoamines as well as polyamines having primary, secondary and tertiary amino groups may be used. Non-limiting examples of suitable amine catalysts are 1,3,5-tris(3-(dimethylamino)propyl)-hexahydro-s-triazine, 2,2'-dimorpholinodiethylether, N-methylmorpholine, N-ethylmorpholine, benzyldimethylamine, N,N-dimethylcyclohexylamine, pentamethyldiethylenetriamine, N,N,N',N'',N''-pentamethyl-dipropylenetriamine, bis-(2-methylaminoethyl)ether, and diazabicyclooctane.

Preferably those catalysts which react into the coating resin (reactive catalysts) are used. The advantage of the reactive catalysts is that if the coated granular substances are used later-on, e.g., as a long-term fertilizer, they cannot be dissolved out of the coating layer. All functional amines having one or more primary, secondary and tertiary amino groups are suitable. The functional amines may contain imino, hydroxy, hydrazino, hydrazono, hydroxyimino and/or sulfanyl functionalities. The preferred embodiment are hydroxy function amines. Non-limiting examples of suitable functional amine catalysts are triethanol amine, dimethylethanol amine, vinyl imidazole, 2-(2-dimethylaminoethoxy) ethanol, 1,3-propane diamine, 3'-iminobis(N,N-dimethylpropylamine), and tetramethyl guanidine. The hydroxy group-containing amine compounds of the general formula (I) also belong to the reactive catalyst.

As the metal catalysts, basically the salts of the elements tin, bismuth, iron, zinc, preferably in combination with organic carboxylates, may be used. Among the suitable metal catalysts, the following examples shall be mentioned: dibutyltin laurate, dioctyltin dilaurate, dioctyltin acetate, zinc neodecanoate, iron(II)chloride, iron(III)chloride, zinc chloride, and bismuth octoate.

In order to achieve specific curing properties, two or more catalysts, which may belong to different classes of compounds, may also be mixed. In order to increase activity, one or more catalysts, which may belong to different classes of compounds, may additionally be added to the polyol component and/or the isocyanate component of the present invention.

The catalysts are preferably used in liquid form. The respective catalysts or catalyst mixtures are added as separate components. They may be applied by dripping in or by spraying as a finely distributed mist. This includes the use of catalysts which are solid at the operating temperature, but were dissolved in a suitable solvent or a plasticizer or were molten prior to their use. Catalysts which are liquid at the operating temperature may also be admixed with suitable solvents and/or plasticizers, e.g., to influence the reaction rate in this manner.

By the use of suitable catalysts in liquid form, the coating systems do not have to be explosion-proof if the flash point of the catalyst is higher than the operating temperature. Moreover, upon exiting the coating apparatus, there is no gas stream which has to be subjected to a specific after-treatment in which the amines are removed from the exhaust air. Thus, there will not be increased demands regarding the tightness of the entire system including the feed and discharge lines, either. Furthermore, if the coating is applied in several layers, the system does not have to be rinsed to be completely free of catalyst prior to applying each new layer in order to prevent a premature reaction of the polyol and the isocyanate components with one another, as is required when gaseous catalysts are used. In this way, the required amount of catalyst may be reduced. All of the above results in enormous cost savings.

The catalysts preferably have a flash point which is at least about 10° C. higher than the operating temperature, in particular at least about 15° C. higher than the operating temperature, particularly preferably at least about 20° C. higher than the operating temperature.

The amount of catalyst required to cure the polyol and the isocyanate components depends on the desired curing time and on the operating temperature. In general, from about 0.1% by weight to about 20% by weight are used, preferably from about 1 to about 10% by weight and particularly preferably from about 3 to about 6% by weight, based on the total amount of the amount of the polyol component and the amount of the isocyanate component used.

Preferably, the polyol component contains from about 10 to about 40% by weight of a base polyol, from about 40 to about 70% by weight of a plasticizer, and from about 5 to about 20% by weight of a diluent, the amount of catalyst is from about 0.1% by weight to about 20% by weight based on the total amount of the amount of the polyol component and the amount of the isocyanate component used, and the catalyst comprises a hydroxy group-containing amine compound selected from the general formulae (II), (III), (IV), and (V) in an amount of at least about 30% by weight.

Particularly preferably, the polyol component contains from about 25 to about 40% by weight of a condensation product of phenols and aldehydes, from about 5 to about 15% by weight of cardanol, from about 50 to about 60% by weight of castor oil, and from about 5 to about 10% by weight of diethylene glycol, the molar ratio of the polyol component to the isocyanate component is from about 1.2:1 to about 1:1.2, the amount of catalyst is from about 3% by weight to about 6% by weight based on the total amount of the amount of the polyol component and the amount of the isocyanate component used, and the catalyst comprises a hydroxy group-containing amine compound selected from the general formulae (II), (III), (IV), and (V) in an amount of at least about 70% by weight.

Moreover, the coating layer may contain additives which were not in advance dissolved in the polyol and/or the isocyanate component, since they are, e.g., not soluble in any of the two components or not compatible with them. These may, inter alia, be active agents which are to be present specifically in the resin layer and not in the coated grain. These active agents are for example, trace elements such as, e.g., boron, copper, manganese, zinc, magnesium, calcium, iron, cobalt, and molybdenum.

Furthermore, the present invention relates to a process for coating a granular substance, comprising the steps (a) of providing a granular substance; (b) providing a polyol component and an isocyanate component; (c) optionally mixing the polyol component with the isocyanate component; (d) adding the mixture of step (c) or the polyol component and the isocyanate component as individual substances to the provided granular substance and producing a coating on the granular substance; (e) curing the coating; (0 optionally repeating steps (d) and (e). The catalyst for curing the compound can be added to the polyol component prior to steps (c) and (d) or in step (e). The catalyst comprises a hydroxy group-containing amine compound of the general formula (I) above. What is preferred is a process for coating a granular substance, comprising the steps of (a) providing a granular substance; (b) providing a polyol component and an isocyanate component; (c) optionally mixing the polyol component with the isocyanate component; (d) adding the mixture of step (c) or the polyol component and the isocyanate component as individual substances to the provided granular substance and producing a coating on the granular substance; (e) adding a catalyst to cure the coating; (f) optionally repeating steps (d) and (e), wherein the catalyst comprises a hydroxy group-containing amine compound of the general formula (I) above. In the process according to the invention, the above-described preferred polyol components, isocyanate components and hydroxy group-containing amine compounds are preferably used in the respective amounts.

In the process according to the invention, the catalyst is preferably added as a separate component in step (e). Thus, is is not required for the catalyst used to be sufficiently soluble in the polyol component. Phase separation or precipitation in the polyol component cannot take place, either. Moreover, this way of proceeding excludes that curing starts already before the two reactants are evenly distributed around the grain to be coated. Since the catalyst reacts into the resin matrix, an optimum distribution of the catalyst is advantageous.

Particularly preferably, the catalyst is added in step (e) in the form of a spray mist. The production of the spray mist is not critical and may be performed by all common processes. For example, the spray mist may be produced by spraying using pressurized air or airless spraying. In order to guarantee optimum distribution of the spray mist, several nozzles may be mounted above the grain bed as well. The spray mist is produced by misting the catalyst containing the liquid amine. By using the spraying process, even better curing may be achieved than with the addition of the catalyst in liquid form. This results in a higher curing rate of the coating and in lower release rates of the active agent from the coated granular substance.

The spray mist may, for example, be produced directly from the liquid catalyst using an airless spray nozzle at a pressure of from 2 to 10 bar, preferably 3 to 5 bar, at a volume flow rate of from 10 to 30 ml/s, based on the liquid catalyst. The required amount of catalyst, based on the amount of resin, is from about 0.1% by weight to about 20% by weight, preferably from about 1 to about 10% by weight and particularly preferably from about 3 to about 6% by weight, based on the total amount of the amount of the polyol component and the amount of the isocyanate component used. The time for adding the catalyst should preferably be less than 1 minute.

In contrast to gassing any with a diluted amine-air mixture, the highly concentrated spray mist makes it possible to at the same time apply such a high amount of catalyst onto the entire coating composition applied at all reaction sites that a simultaneous spontaneous curing may take place on every single grain.

In this way, the highly sensitive gel phase which represents the transition between free-flowing resin mixture and non-adhesive coating surface can be passed extremely quickly without destroying the coating cover which is just being formed.

This result is surprising since actually it would have been expected that at the sites at which the catalyst comes into contact with the resin layer which is not cured yet, due to its high concentration extremely quick curing would take place and the catalyst would, thus, be at least partially trapped so that it is no longer or to a small extent only available for any further curing reaction.

If required, the aforementioned additives may be mixed with the polyol component prior to step (c), applied together with the polyol component and the isocyanate component or the mixture thereof to the granular substance in step (d), or added after step (d) and prior to step (e). If several layers are applied, the additives may be added to all layers or to individual layers only, for example to the outermost layer only.

Coating can be performed most easily in a rotating drum in which the material to be coated is kept in motion during the entire coating process. The polyol and the isocyanate component are added to the material to be coated as a premix or separately, simultaneously or sequentially and are homogeneously distributed thereon. In case additives are to be incorporated into the coating, these may be charged prior to, during or after the addition of the resin.

Instead of a rotating drum, other coating systems may be chosen as well, such as fluidized bed systems or tubular apparatuses in which the coating is either performed by rotating the tube and/or by rotating installations. Likewise, a continuous coating process using a screw conveyor may be used.

The "operating temperature" is the temperature at which steps (d) and (e) are performed. The operating temperature is preferably from about 10° C. to about 160° C., more preferably from about 20° C. to about 100° C., and particularly preferably from about 30° C. to about 95° C.

The catalyst is preferably introduced into the mixture in liquid form as soon as the resin and optionally the additives are homogeneously distributed on the substance to be coated. The residence time until the catalyst is added depends on the effectiveness of the mixing unit, the operating temperature, the amount of material to be coated and the amount of resin and optionally on the amount of additives. The residence time is preferably from about 0 seconds to about 3 minutes, particularly preferably 0 to 1 minute.

The curing conditions, i.e., the type and amount of catalyst or catalyst mixture as well as the operating temperature, are preferably selected such that the time until curing is complete per coating is not more than about 12 minutes, more preferably not more than about 8 minutes, particularly preferably not more than about 4 minutes, and most preferably not more than about 2 minutes. In this context, complete curing is defined such that at this point of time the resin film applied to the granular substance is no longer sticky.

The application of the resin in the amount required for later use may either be performed in one step or the coating may be applied in layers in several partial steps, each partial layer being cured separately. In this way of proceeding, it is, however, not necessary to wait until the underlying layer is completely cured before a further partial layer is applied. It may even be advantageous to apply the respective subsequent partial layer at a point in time at which the previous layer is only partially cured and, thus, there is still the possibility of the layers forming a bond. If the coating has a layered structure, it is conceivable that the individual partial layers consist of resins of different compositions and/or that additives are systematically incorporated into one specific layer, e.g., the outermost layer.

The coating process may be performed both in a batch-wise and in a continuous manner. The latter, for example, by arranging one or more regions for the addition of the resin and optional additives in an alternating manner with one or more regions for the addition of the catalyst in a tubular apparatus. All individual steps, i.e., the addition of uncoated grains, transport from one region to the next, charging the resins, optionally charging additives as well as charging the catalysts and discharge of the finished final products may take place continuously in such a system, so that no time is lost by emptying and refilling the system.

Other embodiments of batchwise or continuously working coating systems are not excluded by the above brief description.

The coated granular substance according to the present invention is preferably obtainable in accordance with the process according to the invention for coating a granular substance as described above. More preferably, the coated granular substance according to the invention is obtained in accordance with the process according to the invention, wherein the catalyst for curing the compound is added in step (e), and particularly preferably the catalyst is added in step (e) in liquid form.

The present invention is characterized by the following items:

1. Coated granular substance, wherein the coating comprises a resin comprising the reaction product of a polyol component and an isocyanate component and cured by the addition of a catalyst, said catalyst comprising at least one hydroxy group-containing amine compound of the general formula (I):

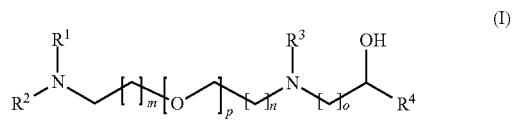

wherein
$R^1$ is a $C_1$ to $C_4$ alkyl group;
$R^2$ is a $C_1$ to $C_4$ alkyl group;
$R^3$ is a $C_1$ to $C_4$ alkyl group, a group $-(CH_2)_q-CH(OH)R^5$ or a group $-CH_2-(CH_2)_r-NR^6R^7$;
$R^4$ is a hydrogen atom or a $C_1$ to $C_4$ alkyl group;
$R^5$ is a hydrogen atom or a $C_1$ to $C_4$ alkyl group;
$R^6$ is a $C_1$ to $C_4$ alkyl group;
$R^7$ is a $C_1$ to $C_4$ alkyl group;
m is an integer of from 0 to 10;
n is an integer of from 0 to 10;
o is an integer of from 1 to 10;
p is an integer of from 0 to 10;
q is an integer of from 1 to 10; and
r is an integer of from 0 to 10.

2. Coated granular substance according to item 1, wherein the hydroxy group-containing amine compound is selected from compounds of the general formulae (II), (III), (IV), and (V):

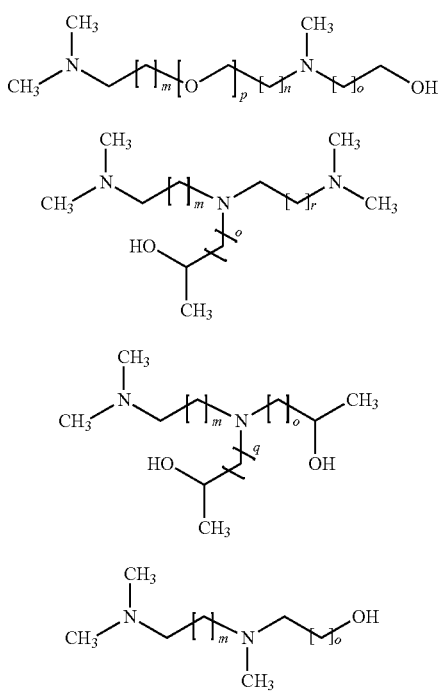

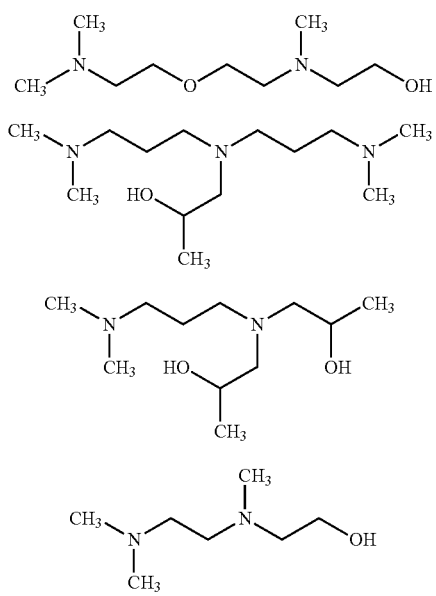

wherein m, n, o, p, q and r are as defined in above item 1.

3. Coated granular substance according to item 2, wherein the hydroxy group-containing amine compound is selected from compounds of the general formulae (IIa), (IIIa), (IVa), and (Va):

4. Coated granular substance according to any one of the preceding items, wherein the polyol component is used in an amount of about 1% by weight to about 20% by weight based on the weight of the granular substance without coating.

5. Coated granular substance according to any one of the preceding items, wherein the stoichiometrical ratio of polyol to isocyanate component is from about 1.3:1 to about 1:1.3.

6. Coated granular substance according to any one of the preceding items, wherein the catalyst is used in an amount of about 0.1% by weight to about 20% by weight, based on the total amount of the polyol component and the amount of the isocyanate component used.

7. Coated granular substance according to any one of the preceding items, wherein the catalyst comprises the hydroxy group-containing amine compound of the general formula (I) in an amount of at least 30% by weight, based on the total amount of catalyst.

8. Coated granular substance according to any one of the preceding items, wherein the polyol component comprises one or more of reactive polyols selected from
   (i) one or more condensation products of a phenol and an aldehyde; and
   (ii) a compound selected from a cardol or cardanol and/or its derivatives or oligomers.

9. Coated granular substance according to item 8, wherein the condensation product comprises a benzyl ether resin, a novolak or a resol.

10. Coated granular substance according to item 9, wherein the condensation product comprises a benzyl ether resin of the general formula (VI):

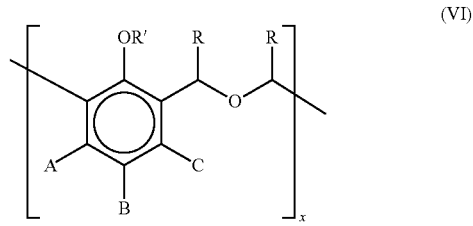

wherein
A, B, C may be the same or different and each represent a hydrogen or halogen atom, a $C_1$ to $C_{10}$ hydrocarbon group, a $C_1$ to $C_{10}$ oxy hydrocarbon group, a methylol group, a isopropylidene phenol or methylene phenol group and when A, B, or C has a hydroxy functionality, the latter may be etherified with a $C_1$ to $C_{10}$ hydrocarbon group;
R is a hydrogen atom or a $C_1$ to $C_{10}$ hydrocarbon group; and
R' is a hydrogen atom or a $C_1$ to $C_{10}$ hydrocarbon group.

11. Coated granular substance according to any one of the preceding items, wherein the polyol component comprises a polyol obtained by epoxidizing, maleinating or hydrogenating cardol and/or cardanol or by reacting cardol and/or cardanol or compounds obtained by maleinating, epoxidizing or hydrogenating with an aldehyde.

12. Coated granular substance according to any one of the preceding items, wherein the polyol component comprises a polyol, obtained by reacting the reaction products as described in item 11 with water and/or an alcohol.

13. Coated granular substance according to any one of the preceding items, wherein the polyol component comprises the oligomer remaining at the bottom of the reaction apparatus after cashew nutshell oil has been heated and cardol and cardanol have been distilled off 14. Coated granular substance according to any one of the preceding items, wherein the isocyanate component of the resin is an aliphatic, aromatic or heterocyclic isocyanate having at least 2 isocyanate groups in a molecule or its oligomers or polymers.

15. Coated granular substance according to item 14, wherein the isocyanate component is toluene diisocyanate, diphenyl methane diisocyanate or an oligomer on this basis.

16. Coated granular substance according to any one of the preceding items, wherein the granular substance is completely water soluble.

17. Coated granular substance according to any one of the preceding items, wherein the granular substance is selected from fertilizers, plant protection agents, insecticides, pesticides, fungicides, drying agents and suitable mixtures thereof 18. Coated granular substance according to any one of the preceding items, wherein the granular substance is an N, NP, NK, PK or NPK fertilizer, calcium ammonium nitrate, ammonium sulphate, ammonium sulphate nitrate, calcium cyanamide or urea.

19. Coated granular substance according to any one of the preceding items, wherein the amount of the coating is from about 2 to about 15% by weight, based on the amount of granular substance.

20. Coated granular substance according to any one of the preceding items, wherein the grain size of the granular substance is about 1 to about 5 mm.

21. Method for coating a granular substance, comprising the steps of
    (a) providing a granular substance;
    (b) providing a polyol component and an isocyanate component;
    (c) optionally mixing the polyol component with the isocyanate component;
    (d) adding the mixture of step (c) or the polyol component and the isocyanate component as individual substances to the provided granular substance and producing a coating on the granular substance;
    (e) curing the coating; and
    (f) optionally repeating steps (d) and (e),
    wherein the catalyst for curing the compound is added to the polyol component prior to steps (c) and (d) or is, preferably, added in step (e) and the catalyst comprises at least one hydroxy group-containing amine compound of the general formula (I):

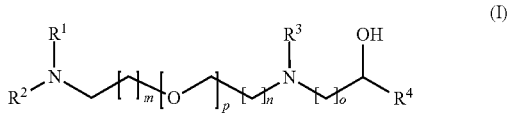

(I)

wherein
R$^1$ is a C$_1$ to C$_4$ alkyl group;
R$^2$ is a C$_1$ to C$_4$ alkyl group;
R$^3$ is a C$_1$ to C$_4$ alkyl group, a group —(CH$_2$)$_q$—CH(OH) R$^5$ or a group —CH$_2$—(CH$_2$)$_2$—CH$_2$—NR$^6$R$^7$;
R$^4$ is a hydrogen atom or a C$_1$ to C$_4$ alkyl group;
R$^5$ is a hydrogen atom or a C$_1$ to C$_4$ alkyl group;
R$^6$ is a C$_1$ to C$_4$ alkyl group;
R$^7$ is a C$_1$ to C$_4$ alkyl group;
m is an integer of from 0 to 10;
n is an integer of from 0 to 10;
o is an integer of from 1 to 10;
p is an integer of from 0 to 10;
q is an integer of from 1 to 10; and
r is an integer of from 0 to 10.

22. Method according to item 21, wherein the hydroxy group-containing amine compound is selected from compounds of the general formulae (II), (III), (IV), and (V):

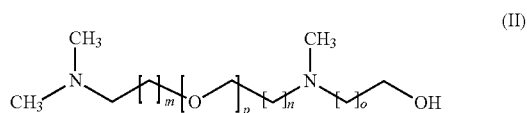

(II)

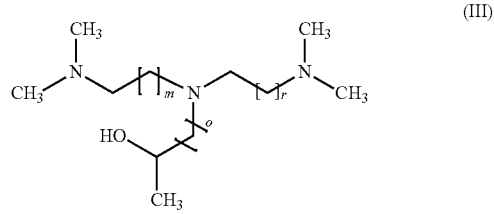

(III)

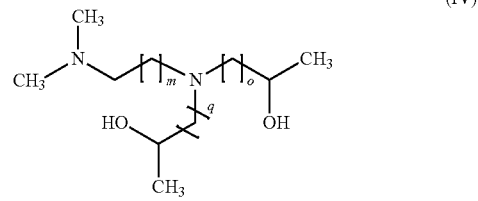

(IV)

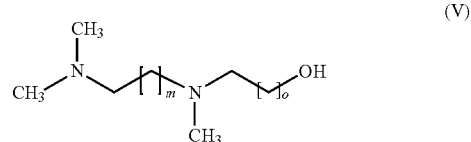

(V)

wherein m, n, o, p, q and r are as defined in item 21.

23. Method according to item 21 or 22, wherein additionally one or more catalysts selected from amine catalysts and metal catalysts are used for curing the coating.

24. Method according to any one of items 21 to 23, wherein in step (e) the catalyst is used in liquid form.

25. Method according to item 24, wherein in step (e) the catalyst is used in the form of a spray.

26. Method according to any one of items 21 to 25, wherein the steps (d) and (e) are performed about twice to about 10 times.

27. Method according to any one of items 21 to 26, wherein the steps (c) to (e) are performed in a rotating drum, wherein preferably the material to be coated is kept in motion during the entire coating process.

28. Method according to any one of items 21 to 26, wherein the steps (c) to (e) are performed in a fluidized bed system or a mixer.

29. Method according to any one of claims 21 to 28, wherein the steps (c) to (e) are performed at a working temperature of from about 10° C. to about 160° C.

30. Method according to any one of items 21 to 29, wherein the coating process is performed batchwise or continuously.

31. Coated granular substance according to any one of items 1 to 20 obtainable by the method according to any one of items 21 to 30.

The following examples illustrate the invention without restricting it.

SYNTHESIS EXAMPLES

Synthesis Example 1: Production of a Phenol Resin Precondensate

In a reaction flask, 458 g phenol, 198 g paraformaldehyde and 0.5 zinc acetate are mixed and are heated to 115° C. under reflux conditions and are maintained at this temperature for one hour. Subsequently, the resulting reaction water is distilled off. The yield amounts to about 85%.

Synthesis Example 2: Production of the Polyol Component

For the production of the polyol component, 30% by weight of the precondensate obtained in Synthesis Example 1 are mixed with 55% by weight castor oil, 10% by weight cardanol and 5% by weight diethylene glycol.

Synthesis Example 3: Providing the Isocyanate Component

The isocyanate component consists of a mixture of oligomers and isomers based on diphenylmethane diisocyanate having an isocyanate content of about 29 to about 33% and a functionality of about 2.7.

Examples 1 to 4

2 kg of a commercial NPK fertilizer granules 16-10-17 having an average grain size of 4 mm are coated. The coating is performed in a rotating container (average diameter of about 38 cm) at a temperature of 70° C. The fertilizer is kept in motion during the entire coating process. The polyol component of Synthesis Example 2 is mixed homogenously in an amount of 1% by weight based on fertilizer granules with the isocyanate component of Synthesis Example 3 in an amount of 1% by weight based on fertilizer granules for A seconds and the resulting reaction mixture is evenly distributed on the granules to be coated within B seconds, homogenously distributed for C seconds and then cured by means of adding dropwise 0.1% by weight based on fertilizer granulate of a reactive amine catalyst. The curing process lasts about D seconds until the material is completely free-flowing and the next layer can be applied (see Table 1).

The amount of coating material amounts to a total of 10% by weight based on fertilizer granules. This amount was applied on the granules in the described way in several cycles. Thereby, the resin is cured after each coating process to reduce the adhesion tendency. In total, 5 layers were applied.

In Examples 1-4, the following catalysts were used:
Jeffcat Z-110: N,N,N'-trimethylaminoethyl-ethanolamine;
Jeffcat ZR-50: N,N-bis(3-dimethylaminopropyl)-N-isopropanolamine;
Jeffcat ZF-10: N,N,N'-trimethyl-N'-hydroxyethylbisaminoethylether; and
Jeffcat DPA: N-(3-dimethylaminopropyl)-N,N-diisopropanolamine.

The catalysts are sold by Huntsman Corporation.

TABLE 1

| Example | Catalyst | A | B | C | D |
|---|---|---|---|---|---|
| 1 | Jeffcat Z-110 | 40 | 30 | 30 | 50 |
| 2 | Jeffcat ZR-50 | 40 | 30 | 30 | 600 |
| 3 | Jeffcat ZF-10 | 40 | 30 | 30 | 120 |
| 4 | Jeffcat DPA | 40 | 30 | 30 | 600 |

Example 5

Example 1 was repeated, however, as a catalyst a mixture of 50% by weight of Jeffcat Z-110 and 50% by weight of DBTL (dibutyltin dilaurate) was used as a metal catalyst.

Example 6

Example 1 was repeated, however, the catalyst Jeffcat Z-110 was applied with an airbrush and was not added dropwise as described in Examples 1 to 5.

Comparative Example 1

Example 1 was repeated, however, N,N-dimethylethanolamine (DMEA) was used as a catalyst.

Comparative Example 2

Example 1 was repeated, however, a catalyst-gas-mixture which consisted of nitrogen saturated at 20° C. with dimethylisopropylamine was used as a catalyst.

Comparative Example 3

Example 1 was repeated, however, catalyst Jeffcat Z-110 was added to the polyol component before the latter was mixed with the isocyanate component.

Example 7: Determination of the Release of Active Agent in Boiling Water

The coated fertilizer granules of Example 1, Comparative Example 1 and Comparative Example 2 were examined. For determining the release of active agent, 10 g of the coated fertilizer granules are put into 850 ml boiling demineralized water (1 l, 3-neck flask with reflux condenser) and are refluxed for 9 h. The release of active agent is determined by the increase in conductivity of the water. The results can be taken from FIG. 1 (▲: Example 1; ■: Comparative Example 1; ◆: Comparative Example 2; ●: Example 6). It can be seen from FIG. 1 that the release rates of the coated fertilizer granules show a comparable course. The high flash point of Jeffcat Z110 turns out to be a technical advantage so that neither explosion-proof equipment nor an expensive amine washer is necessary.

Example 8: Determination of the Release of Active Agent at Room Temperature

Figure 2:
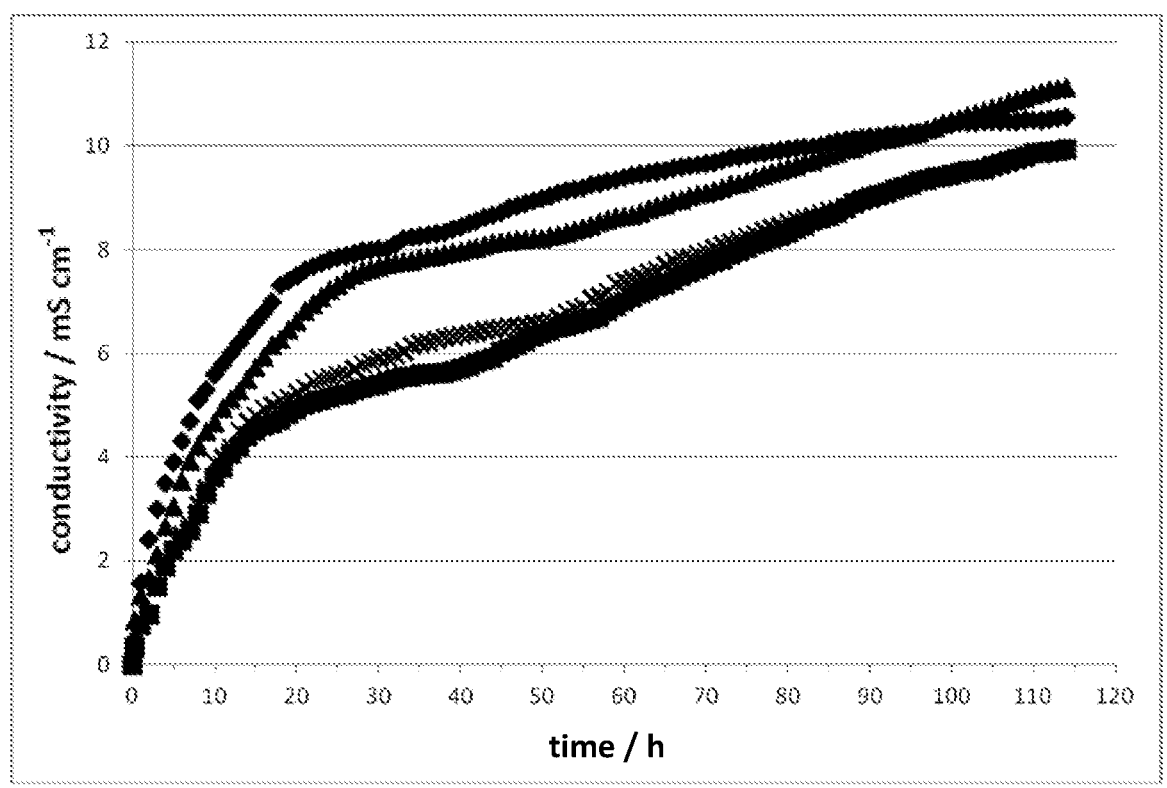
FIG. 2 is a graph showing the release of active agent is determined by the increase in conductivity of the water.

The coated fertilizer granules of Examples 1, 5 and 6 and the Comparative Examples 2 and 3 were examined. For determining the release of active agent, 10 g of the coated fertilizer granules are put into 850 ml distilled water and are kept in motion by means of a magnetic stirrer. The release of active agent is determined by the increase in conductivity of the water. The results are to be taken from FIG. 2 (▲: Example 1; ◆: Example 5; ■: Comparative Example 2; ×:

Example 6). It can be seen from FIG. 2 that the release rates of the coated fertilizer granules show a comparable course.

It is to be taken from Table 2 that when using a hydroxy group-containing amine compound as a catalyst (with or without additional metal catalyst) for curing the coating in a short time, coated granular fertilizer granules of high quality can be obtained (Examples 1, 5 and 6). In contrast thereto, the curing of the coating can not be finished in a short time when using the gaseous catalyst dimethyl isopropylamine since it is necessary to remove the gaseous catalyst (blowing free) before the next coating step (adding the resin) is performed. Hence, the processing time is increased. When using a liquid hydroxy group-containing amine compound as a catalyst in the polyol component, the addition of the catalyst leads to a turbidity in the polyol component and to an increase in viscosity of the polyol component, indicating an incompatibility of the catalyst with the polyol component. Furthermore, the distribution of the resin on the fertilizer granule was uneven and thus the quality of the coating was not sufficient, the too short curing time led to clogging of the coated granules and a layer of adhered granules formed on the inside of the rotating container. Thus, repetition of the process is made difficult since the container must first be laboriously cleaned.

TABLE 2

|  | Example | | | Comparative Example 2 | Comparative Example 3 |
|---|---|---|---|---|---|
|  | Example 1 | Example 5 | Example 6 | | |
| catalyst | Jeffcat Z-110 | Jeffcat Z-110 + metalcatalyst | Jeffcat Z-110 | dimethyl isopropylamie | Jeffcat Z-110 |
| kind of catalyst | amine, liquid, as 3$^{rd}$ component | amine liquid, as 3$^{rd}$ component + metalcatalyst | spraying method | gaseous | amine liquid in the polyol component |
| quality of the coating | even, no clogging | even, no clogging | even, no clogging | even, no clogging | uneven, clogging |
| processing time | "short" | "short" | "short" | "long" | "too short", clogging |
| conductivity after 24 h (mS/cm) | 1.34 | 1.58 | 0.77 | 0.76 | |
| conductivity after 100 d (mS/cm) | 10.47 | 10.43 | 9.47 | 9.44 | |

The invention claimed is:

1. A coated granular substance, wherein the coating comprises a resin comprising the reaction product of a polyol component and an isocyanate component and cured by the addition of a catalyst, said catalyst comprising at least one hydroxy group-containing amine compound of the general formula (I):

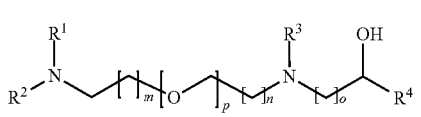

(I)

wherein
$R^1$ is a $C_1$ to $C_4$ alkyl group;
$R^2$ is a $C_1$ to $C_4$ alkyl group;
$R^3$ is a $C_1$ to $C_4$ alkyl group, a group —$(CH_2)_q$—CH(OH)$R^5$ or a group —$CH_2$—$(CH_2)_r$—$NR^6R^7$;
$R^4$ is a hydrogen atom or a $C_1$ to $C_4$ alkyl group;
$R^5$ is a hydrogen atom or a $C_1$ to $C_4$ alkyl group;
$R^6$ is a $C_1$ to $C_4$ alkyl group;
$R^7$ is a $C_1$ to $C_4$ alkyl group;
m is an integer of from 0 to 10;
n is an integer of from 0 to 10;
o is an integer of from 1 to 10;
p is an integer of from 0 to 10;
q is an integer of from 1 to 10; and
r is an integer of from 0 to 10,
wherein the polyol component comprises one or more condensation products of a phenol and an aldehyde, and/or at least one compound selected from the group consisting of a cardol, a cardol derivative, a cardol oligomer, a cardanol, a cardanol derivative, and a cardanol oligomer.

2. The coated granular substance according to claim 1, wherein the hydroxy group-containing amine compound is selected from the group consisting of compounds of the general formulae (II), (III), (IV), and (V):

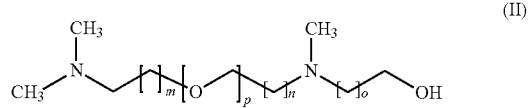

(II)

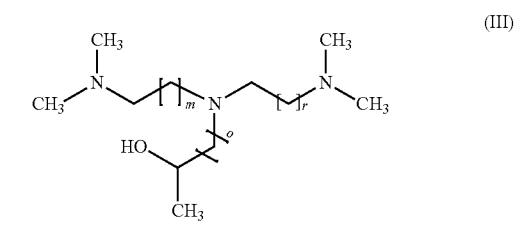

(III)

-continued

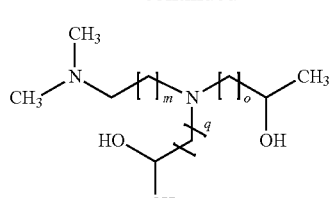 (IV)

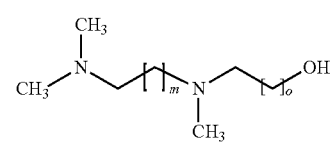 (V)

wherein m, n, o, p, q and r are as defined in claim 1.

3. The coated granular substance according to claim 2, wherein the hydroxy group-containing amine compound is selected from the group consisting of compounds of the general formulae (IIa), (IIIa), (IVa), and (Va):

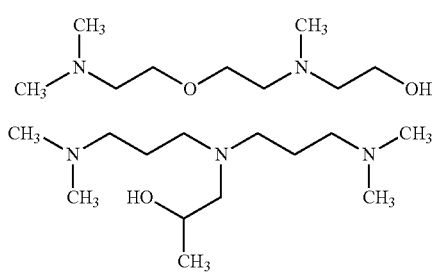
(IIa)
(IIIa)
(IVa)
(Va)

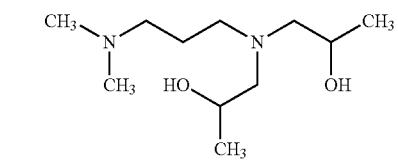

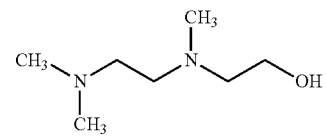

4. The coated granular substance according to claim 1, wherein the polyol component is used in an amount of about 1% by weight to about 20% by weight based on the weight of the granular substance without coating.

5. The coated granular substance according to claim 1, wherein the stoichiometrical ratio of polyol to isocyanate component is from about 1.3:1 to about 1:1.3.

6. The coated granular substance according to claim 1, wherein the catalyst is used in an amount of about 0.1% by weight to about 20% by weight, based on the total amount of the polyol component and the amount of the isocyanate component used.

7. The coated granular substance according to claim 1, wherein the catalyst comprises the hydroxy group-containing amine compound of the general formula (I) in an amount of at least about 30% by weight, based on the total amount of catalyst.

8. The coated granular substance according to claim 1, wherein the granular substance is selected from the group consisting of fertilizers, plant protection agents, insecticides, pesticides, fungicides, drying agents and mixtures thereof.

9. The coated granular substance according to claim 1, wherein the amount of the coating is from about 2 to about 15% by weight, based on the amount of granular substance.

10. The coated granular substance according to claim 1, wherein the grain size of the granular substance is about 1 to about 5 mm.

11. A method for coating a granular substance, comprising the steps of
   (a) providing a granular substance;
   (b) providing a polyol component and an isocyanate component;
   (c) optionally mixing the polyol component with the isocyanate component;
   (d) adding the mixture of step (c) or the polyol component and the isocyanate component as individual substances to the provided granular substance and producing a coating on the granular substance;
   (e) curing the coating; and
   (f) optionally repeating steps (d) and (e),
   wherein the catalyst for curing the compound is added to the polyol component prior to steps (c) and (d) or is added in step (e) and the catalyst comprises at least one hydroxy group-containing amine compound of the general formula (I):

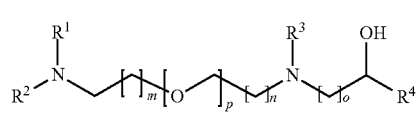 (I)

wherein
$R^1$ is a $C_1$ to $C_4$ alkyl group;
$R^2$ is a $C_1$ to $C_4$ alkyl group;
$R^3$ is a $C_1$ to $C_4$ alkyl group, a group $-(CH_2)_q-CH(OH)R^5$ or a group $-CH_2-(CH_2)_r-CH_2-NR^6R^7$;
$R^4$ is a hydrogen atom or a $C_1$ to $C_4$ alkyl group;
$R^5$ is a hydrogen atom or a $C_1$ to $C_4$ alkyl group;
$R^6$ is a $C_1$ to $C_4$ alkyl group;
$R^7$ is a $C_1$ to $C_4$ alkyl group;
m is an integer of from 0 to 10;
n is an integer of from 0 to 10;
o is an integer of from 1 to 10;
p is an integer of from 0 to 10;
q is an integer of from 1 to 10; and
r is an integer of from 0 to 10.

12. The method according to claim 11, wherein the hydroxy group-containing amine compound is selected from the group consisting of compounds of the general formulae (II), (III), (IV), and (V):

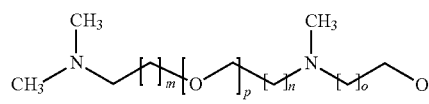 (II)

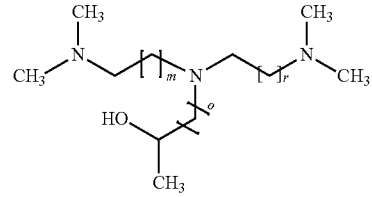 (III)

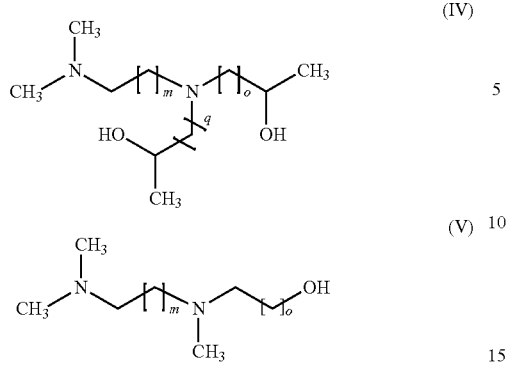

wherein m, n, o, p, q and r are as defined in claim 11.

13. The method according to claim 11, wherein in step (e) the catalyst is used in liquid form.

14. The method according to claim 13, wherein in step (e) the catalyst is used in the form of a spray.

15. A coated granular substance made by the method according to claim 11, wherein the polyol component comprises one or more condensation products of a phenol and an aldehyde, and/or at least one compound selected from the group consisting of a cardol, a cardol derivative, a cardol oligomer, a cardanol, a cardanol derivative, and a cardanol oligomer.

* * * * *